(12) United States Patent  
Masaki

(10) Patent No.: US 7,679,032 B2  
(45) Date of Patent: Mar. 16, 2010

(54) SOLDERING OR DESOLDERING IRON

(75) Inventor: Hiroyuki Masaki, Osaka (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 10/874,856

(22) Filed: Jun. 22, 2004

(65) Prior Publication Data

US 2004/0232132 A1 Nov. 25, 2004

(30) Foreign Application Priority Data

Jul. 4, 2003 (JP) ............................. 2003-191852

(51) Int. Cl.
- *H05B 3/42* (2006.01)
- *H05B 3/16* (2006.01)
- *B23K 3/02* (2006.01)

(52) U.S. Cl. ................... 219/229; 219/238; 219/241; 219/543; 228/51; 228/55

(58) Field of Classification Search ............... 219/229, 219/241, 238, 543, 552; 228/51, 55  
See application file for complete search history.

(56) References Cited

U.S. PATENT DOCUMENTS

| | | | |
|---|---|---|---|
| 29,039 | A | 7/1860 | Patee |
| 53,545 | A | 3/1866 | Trowbridge |
| 62,941 | A | 3/1867 | Crosby |
| 73,798 | A | 1/1868 | Gleason |
| 154,077 | A | 8/1874 | Perkins |
| 573,245 | A | 12/1896 | Stutz et al. |
| 1,098,437 | A * | 6/1914 | Hadaway, Jr. ............... 219/238 |
| 1,350,181 | A | 8/1920 | Remane |
| 1,667,618 | A | 4/1928 | Abbott |
| 2,213,438 | A | 9/1940 | Young |
| 2,390,498 | A | 12/1945 | Capita |
| 2,582,481 | A | 1/1952 | Dvorak et al. |
| 2,679,223 | A | 5/1954 | Franklin |

(Continued)

FOREIGN PATENT DOCUMENTS

DE 2412143 9/1975

(Continued)

*Primary Examiner*—Stephen J Ralis  
(74) *Attorney, Agent, or Firm*—Squire, Sanders & Dempsey, L.L.P.

(57) ABSTRACT

A soldering or a desoldering tool includes a replaceable tip with a recess adapted to receive a portion of a temperature sensor to measure the temperature of the tip. Positioning the temperature sensor within the tip allows the temperature to be quickly measured so that the temperature near the tip may be more accurately monitored and controlled. The temperature sensor may be also integrated with the heater near the tip such that the temperature sensor is between the tip and the heater and near both of them so that the temperature of the tip is substantially that of the temperature of the heater. A sleeve may enclose the temperature sensor and the heater with a portion of the temperature sensor extending out from the foreward end of the sleeve. The replaceable tip may also have a bore adapted to receive a head protruding from the foreward end of the sleeve to couple the tip at a predetermined orientation with respect to the sleeve. The combination of bore and head allows the replaceable tip to be coupled with the sleeve in a consistent manner so that the temperature of the replacement tips can be measured accurately and dependably.

12 Claims, 13 Drawing Sheets

U.S. PATENT DOCUMENTS

| | | | |
|---|---|---|---|
| 2,689,901 A | 9/1954 | Obolensky | |
| 2,751,484 A | 6/1956 | Moon | |
| 2,908,796 A | 10/1959 | Reichelt et al. | |
| 2,982,838 A | 5/1961 | Tyler | |
| 3,037,274 A | 6/1962 | Hancock | |
| 3,188,448 A | 6/1965 | Weller | |
| 3,211,354 A | 10/1965 | Dugard et. al. | |
| 3,245,599 A | 4/1966 | Johnson | |
| 3,269,633 A | 8/1966 | Bemier et al. | |
| 3,315,350 A | 4/1967 | Kent | |
| 3,358,897 A | 12/1967 | Christensen | |
| 3,429,024 A * | 2/1969 | Postorino | 29/417 |
| 3,443,733 A | 5/1969 | Parente | |
| 3,578,948 A | 5/1971 | Friend at al. | |
| 3,584,190 A | 6/1971 | Marcoux | |
| 3,627,191 A | 12/1971 | Hood, Jr. | |
| 3,646,577 A * | 2/1972 | Ernst | 219/241 |
| 3,699,306 A * | 10/1972 | Finch | 219/241 |
| 3,715,797 A | 2/1973 | Jackson at al. | |
| 3,716,692 A * | 2/1973 | Schick et al. | 219/241 |
| 3,770,937 A * | 11/1973 | Smits | 219/241 |
| 3,804,320 A | 4/1974 | Vandermark | |
| 3,818,539 A | 6/1974 | Fortune | |
| 3,834,604 A | 9/1974 | Fendley et al. | |
| 3,876,857 A | 4/1975 | Dhillon | |
| 3,883,716 A | 5/1975 | Fortune | |
| 3,884,409 A | 5/1975 | Kaufman | |
| 3,899,114 A * | 8/1975 | Kleeberg | 228/55 |
| 3,919,524 A | 11/1975 | Fortune | |
| 3,941,299 A | 3/1976 | Godfrey | |
| 3,943,326 A | 3/1976 | Henry | |
| 3,990,623 A * | 11/1976 | Fortune | 228/57 |
| 4,023,724 A | 5/1977 | Wakita et al. | |
| 4,034,202 A | 7/1977 | Vandermark | |
| 4,035,613 A * | 7/1977 | Sagawa et al. | 219/552 |
| 4,055,744 A * | 10/1977 | Fortune | 219/239 |
| 4,064,447 A | 12/1977 | Edgell et al. | |
| 4,090,517 A * | 5/1978 | Takenaka | 604/114 |
| 4,133,291 A | 1/1979 | Spirig | |
| 4,137,369 A | 1/1979 | Chaikin | |
| 4,164,606 A | 8/1979 | Spirig | |
| 4,191,917 A | 3/1980 | Brown et al. | |
| 4,206,864 A | 6/1980 | Rauchwerger | |
| 4,416,408 A | 11/1983 | Sirig | |
| 4,553,021 A | 11/1985 | Conti | |
| 4,560,101 A | 12/1985 | Wilhelmson et al. | |
| 4,562,337 A | 12/1985 | Lawrence | |
| 4,568,819 A | 2/1986 | Stacconi | |
| 4,698,774 A | 10/1987 | Abe et al. | |
| 4,745,264 A | 5/1988 | Carter | |
| 4,775,776 A | 10/1988 | Rahn et al. | |
| 4,779,786 A | 10/1988 | Holdway | |
| 4,779,790 A | 10/1988 | Wallgren et al. | |
| 4,795,886 A | 1/1989 | Carter, Jr. | |
| 4,830,260 A | 5/1989 | Kent | |
| 4,839,501 A | 6/1989 | Cowell | |
| 4,877,944 A | 10/1989 | Cowell et al. | |
| 4,891,497 A | 1/1990 | Yoshimura | |
| 4,903,884 A | 2/1990 | Royston et al. | |
| 4,924,067 A | 5/1990 | Wilhelmson | |
| 4,945,210 A | 7/1990 | Yoshimura | |
| 4,997,121 A | 3/1991 | Yoshimura | |
| 5,007,574 A | 4/1991 | Cariomago et al. | |
| 5,014,210 A | 5/1991 | Postlewait et al. | |
| 5,023,848 A | 6/1991 | Frey et al. | |
| 5,033,785 A | 7/1991 | Woolley, Jr. | |
| 5,059,769 A * | 10/1991 | Fortune | 219/238 |
| 5,062,564 A | 11/1991 | Urban | |
| 5,083,698 A | 1/1992 | Forsha | |
| 5,094,139 A | 3/1992 | Forsha | |
| 5,122,637 A | 6/1992 | Bottorff et al. | |
| 5,151,574 A | 9/1992 | Urban | |
| 5,170,024 A | 12/1992 | Hanatani et al. | |
| 5,182,427 A | 1/1993 | McGaffigan | |
| 5,297,717 A | 3/1994 | Parry | |
| 5,305,941 A | 4/1994 | Kent et al. | |
| 5,326,016 A | 7/1994 | Cohen et al. | |
| 5,329,085 A | 7/1994 | Cowell et al. | |
| 5,395,046 A | 3/1995 | Knobbe et al. | |
| 5,402,563 A | 4/1995 | Satoh et al. | |
| 5,408,072 A | 4/1995 | Nagase | |
| 5,412,178 A | 5/1995 | Tamura | |
| 5,446,262 A | 8/1995 | McCambridge | |
| 5,495,093 A | 2/1996 | Griffith | |
| 5,553,767 A | 9/1996 | Weller | |
| 5,572,119 A | 11/1996 | Taylor | |
| 5,579,533 A | 11/1996 | Weller | |
| 5,683,603 A | 11/1997 | Fortune | |
| 5,746,367 A | 5/1998 | Pai et al. | |
| 5,770,835 A | 6/1998 | Sakuyama et al. | |
| 5,796,072 A * | 8/1998 | Okuno | 219/229 |
| 5,823,419 A * | 10/1998 | Ichikawa | 228/55 |
| 5,837,973 A | 11/1998 | Tamura | |
| 5,901,898 A | 5/1999 | Stempke | |
| 5,938,258 A | 8/1999 | Femling | |
| 6,019,270 A | 2/2000 | Boll et al. | |
| 6,054,678 A | 4/2000 | Miyazaki | |
| 6,087,631 A | 7/2000 | Miyazaki | |
| 6,186,387 B1 | 2/2001 | Lawrence et al. | |
| 6,215,104 B1 | 4/2001 | Kurpiela et al. | |
| 6,235,027 B1 | 5/2001 | Herzon | |
| 6,237,831 B1 | 5/2001 | Lawrence et al. | |
| 6,237,931 B1 | 5/2001 | Marola | |
| 6,248,983 B1 | 6/2001 | Yamanoi | |
| 6,386,423 B1 | 5/2002 | Adler et al. | |
| 6,563,087 B1 | 5/2003 | Yokoyama et al. | |
| 6,580,050 B1 | 6/2003 | Miller et al. | |
| 6,652,175 B2 | 11/2003 | Chang | |
| 6,710,304 B2 | 3/2004 | Yokoo | |
| 6,750,431 B2 | 6/2004 | Miyazaki | |
| 6,766,817 B2 | 7/2004 | da Silva | |
| 6,793,114 B2 | 9/2004 | Dunham et al. | |
| 6,818,862 B2 | 11/2004 | Uetani et al. | |
| 6,899,114 B2 * | 5/2005 | Wilson | 137/9 |
| 2002/0079305 A1 * | 6/2002 | Matubara | 219/229 |
| 2002/0158107 A1 | 10/2002 | Yokoo | |
| 2004/0016741 A1 | 1/2004 | Evanyk | |
| 2004/0232132 A1 | 11/2004 | Masaki | |
| 2006/0022018 A1 | 2/2006 | Yoshimura et al. | |
| 2006/0186175 A1 | 8/2006 | Kay | |

FOREIGN PATENT DOCUMENTS

| | | |
|---|---|---|
| EP | 0386948 | 9/1990 |
| EP | 0499734 | 2/1991 |
| EP | 1044751 | 10/2000 |
| GB | 1284994 | 8/1972 |
| GB | 2148676 | 5/1985 |
| JP | S48-67025 U | 8/1973 |
| JP | 54-161509 | 12/1979 |
| JP | 61001230 | 1/1986 |
| JP | 3001893 | 6/1994 |
| JP | 409057434 A | 3/1997 |
| JP | 11337468 A | 12/1999 |
| JP | 2000288723 | 1/2000 |
| JP | 2000317629 | 11/2000 |
| JP | 2001-71127 | 3/2001 |
| JP | 2001-245462 | 9/2001 |
| WO | PCT/EP97/00220 | 1/1996 |
| WO | WO 9726108 A1 * | 7/1997 |

* cited by examiner

FIG. 9a
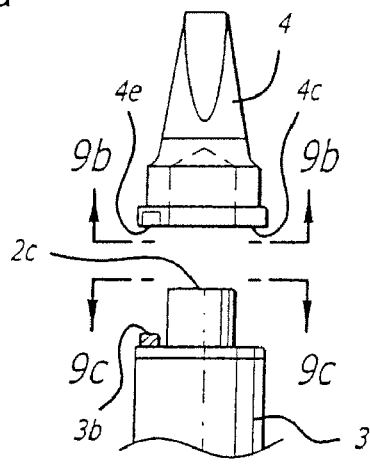
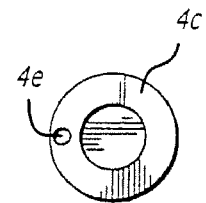
FIG. 9b
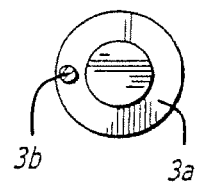
FIG. 9c
FIG. 9d
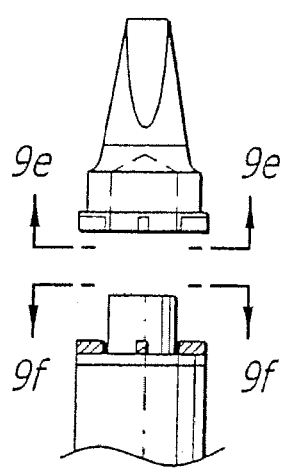
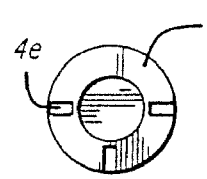
FIG. 9e
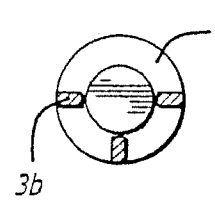
FIG. 9f
FIG. 9g
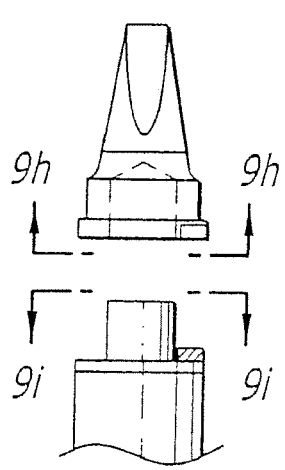
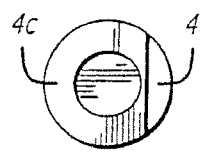
FIG. 9h
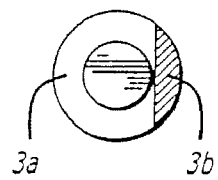
FIG. 9i

SOLDERING OR DESOLDERING IRON

CROSS-REFERENCE TO RELATED APPLICATION

This application claims priority to Japanese Patent Application No. JP-App-2003-191852, filed Jul. 4, 2003, which is hereby incorporated by reference.

FIELD OF THE INVENTION

This invention relates to a soldering iron or a desoldering iron, and in particular to a soldering (or desoldering) iron capable of accurately measuring the temperature of its tip and of having its tip replaced if needed.

BACKGROUND OF THE INVENTION

FIG. 11 is a cross-sectional view of a conventional soldering iron 50 in a disassembled state. The conventional soldering iron 50 has an insert pipe 51 for coupling a heater 52 to a sleeve 53 which has a protruding tip 54. The heater 52 is removeably inserted into the sleeve 53 so that heat from the heater is conducted to the tip 54. The insert pipe 51 is positioned between the sleeve 53 and the heater 52; when in position a gap is formed between the sleeve 53 and the heater 52. This gap inhibits thermal heat from conducting from the heater 52 to the sleeve 53, resulting in poor thermal efficiency. After a period of use, oxidization may form near the gap due to high temperature around the gap. This in turn may cause the sleeve 53 to erode due to oxidization. The oxidization in the gap further reduces the thermal efficiency of the soldering iron 50.

Another shortcoming of the conventional soldering iron 50 is that once the tip 54 becomes worn, the sleeve 53 has to be replaced with the tip. In addition, in situations where the heating tip 54 and the heater 52 are bonded together due to oxidization, it may be necessary to replace the heating tip 54 and the heater 52.

The conventional soldering irons may also have a temperature sensor that is positioned away from the tip so that there is a time lag or delay in measuring the temperature of the tip by the temperature sensor. To compensate for the delay, the conventional soldering irons use expensive control devices, such as proportional, integral, derivative (PID) devices, to control the temperature of the tip. The delay also makes the conventional soldering iron inefficient because when the conventional soldering iron is initially turned on, the heater generates excess heat above the desired set temperature value. That is, the control device continues to provide power to the heater because the temperature sensor is slow to measure the rise in temperature near the tip. As a result, the actual temperature near the tip exceeds the desired temperature. Because of the excess heat generated by the heater, the handle is made longer so that the user may more comfortably hold the handle.

SUMMARY OF THE INVENTION

This invention provides a soldering tool that includes a tip having a recess formed on its base. The temperature sensor may be provided on one end of a rod and the rod may be pressed through a thermal sleeve to allow at least a portion of the temperature sensor to protrude from the thermal sleeve. The recess in the tip is adapted to receive the protruding portion of the temperature sensor extending from the thermal sleeve. On the opposite end of the rod, electrical contacts may be provided to provide power to the heater mechanism embedded within the thermal sleeve. The electrical contact end of the heater mechanism is inserted into the handle and the tip is placed on top of the thermal sensor. A clamp is then placed over the tip and the sleeve, and is releasably engaged with the handle to securely hold the tip and the sleeve onto the handle. The tip is replaceable or separable from the thermal sleeve. This way, the tip alone may be replaced, for example when it becomes worn, rather than the entire thermal sleeve assembly, minimizing the cost of replacement parts.

The tip has a recess to receive the temperature sensor/heater combination protruding from the thermal sleeve. This allows the temperature sensor/heater combination to be closer to the tip so that the tip may be heated to the desired temperature more quickly and the temperature of the tip monitored more accurately. The sensor can extend between the tip and the sleeve to monitor the temperature of both the tip and the sleeve. This allows the sensor to measure the average temperature between the tip and the sleeve. In addition, the sensors are placed near the outer surface of the ceramic heater to better monitor the temperature of the tip and the sleeve. The temperature sensor and the heater may be bonded together so that they are thermally unified whereby the tip, sensor, and the heater will all have substantially the same temperature during the operation of the soldering tool.

According to another invention disclosed herein, one or more heaters are positioned in a thermal sleeve for a soldering iron or a desoldering iron in close contact therewith and no gaps therebetween. A temperature sensor can be disposed in the sleeve, either with a portion of the sensor extending out from an end of the sleeve or with the entire sensor positioned in the sleeve. The sleeve can have a through-slot extending the entire length of the sleeve. The sleeve can have one or more through-slots from an end of the sleeve longitudinally to a central portion of the sleeve. The heater can be a ceramic rod heater.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 9(a) is an enlarged exploded view of a tip having a bore with a corresponding head protruding from the sleeve.

FIG. 9(b) is a view taken along line 9(b)-9(b) of FIG. 9(a) showing the base of the tip.

FIG. 9(c) is a view taken along line 9(c)-(c) of FIG. 9(a) showing the face end of the sleeve.

FIG. 9(d) is an enlarged exploded view of a tip having an alternative bore with a corresponding head protruding from the sleeve.

FIG. 9(e) is a view taken along line 9(e)-9(e) of FIG. 9(d) showing the base of the tip.

FIG. 9(f) is a view taken along line 9(f)-(f) of FIG. 9(d) showing the face end of the sleeve.

FIG. 9(g) is an enlarged exploded view of a tip having another alternative bore with a corresponding head protruding from the sleeve.

FIG. 9(h) is a view taken along line 9(h)-9(h) of FIG. 9(g) showing the base of the tip.

FIG. 9(i) is a view taken along line 9(i)-(i) of FIG. 9(g) showing the face end of the sleeve.

DETAILED DESCRIPTION OF PREFERRED EMBODIMENTS OF THE INVENTION

Figure 1:
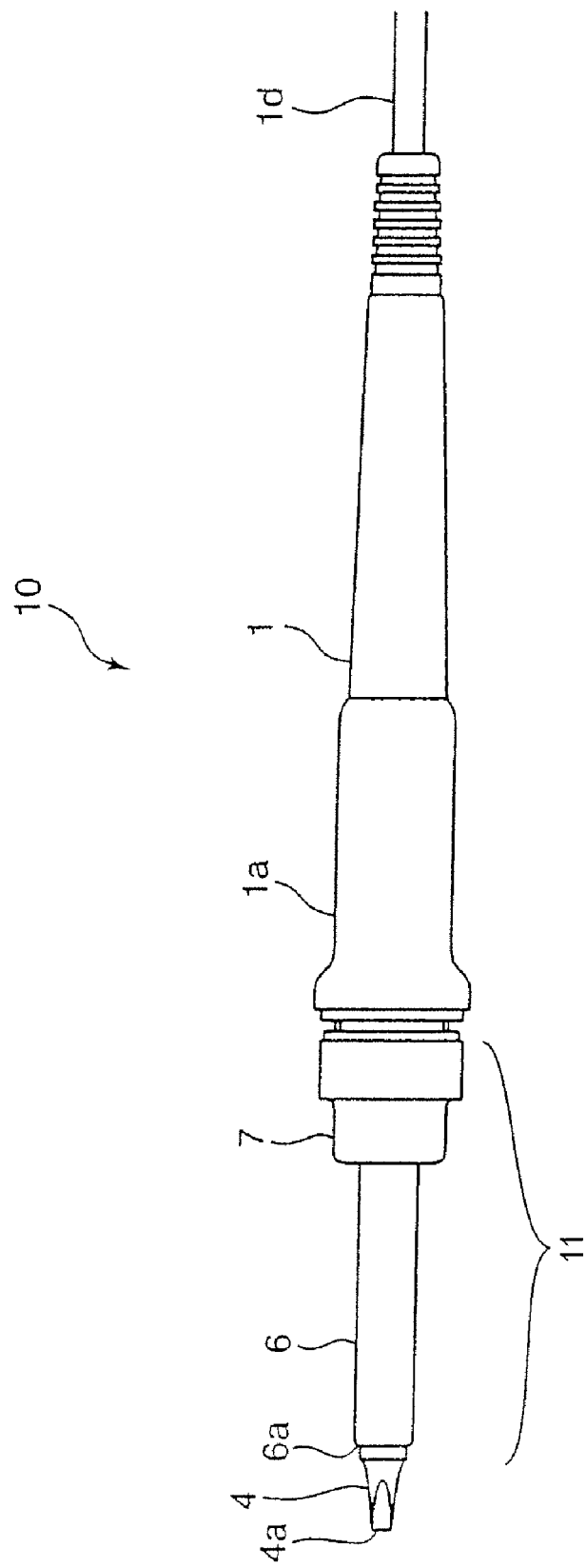
FIG. 1 illustrates a soldering iron in accordance with the present invention having a replaceable tip.

FIG. 1 illustrates a soldering iron generally at 10 having a heater cartridge assembly 11 and a removable and replaceable tip 4 protruding from the assembly. The tip 4 may be replaced with another tip as the tip wears out or when a different tip is better suited for a particular soldering operation. The soldering iron 10 includes a clamping ring or member 7 that releasably holds the heater cartridge assembly 11 to the casing 1. As further discussed below, the heater cartridge assembly 11 includes a locking tube 6 that retains the tip 4 such that the tip protrudes from the locking tube. To replace the tip 4, the clamping ring 7 may be disengaged from the casing 1 to release the heater cartridge assembly 11 from the casing, and the tip 4 may then be released from the heater cartridge assembly 11 and replaced with another desired tip.

Figure 2:
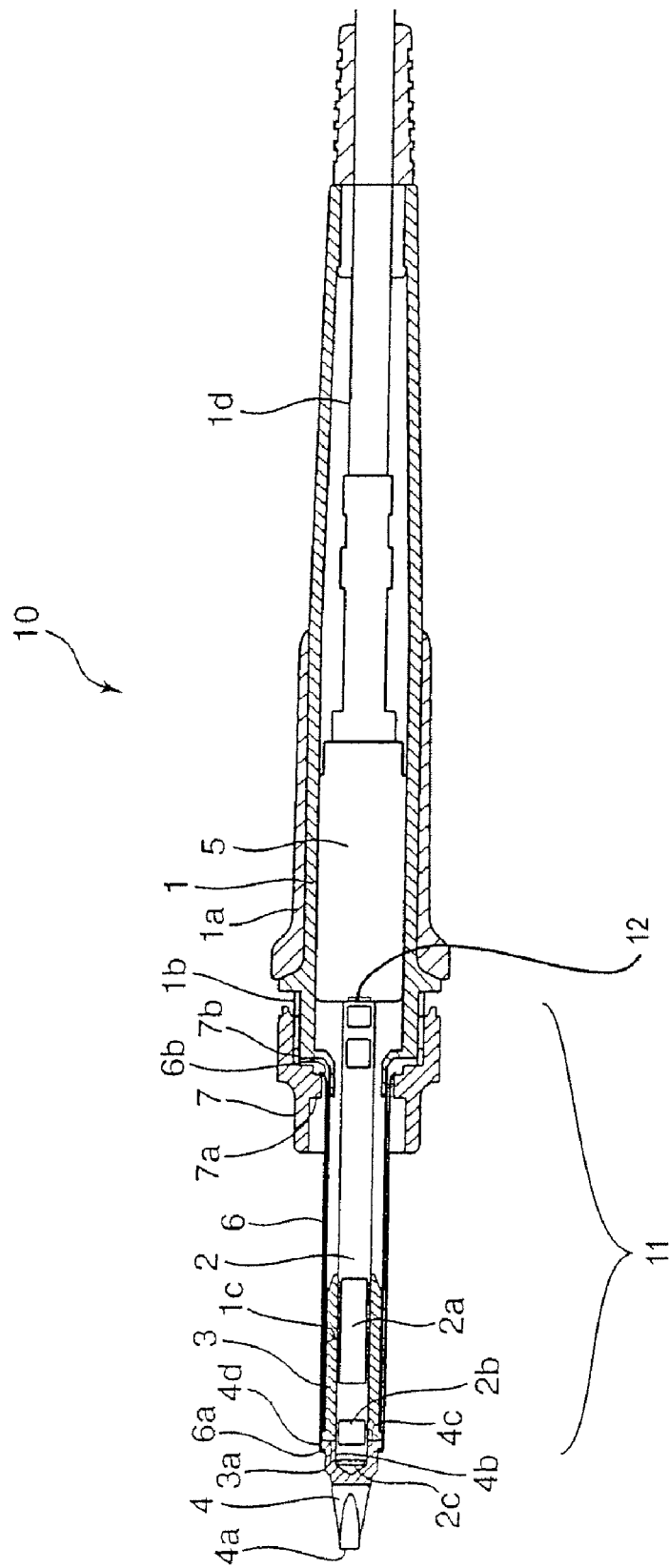
FIG. 2 is a longitudinal cross-sectional view of the soldering iron of FIG. 1.
Figure 3:
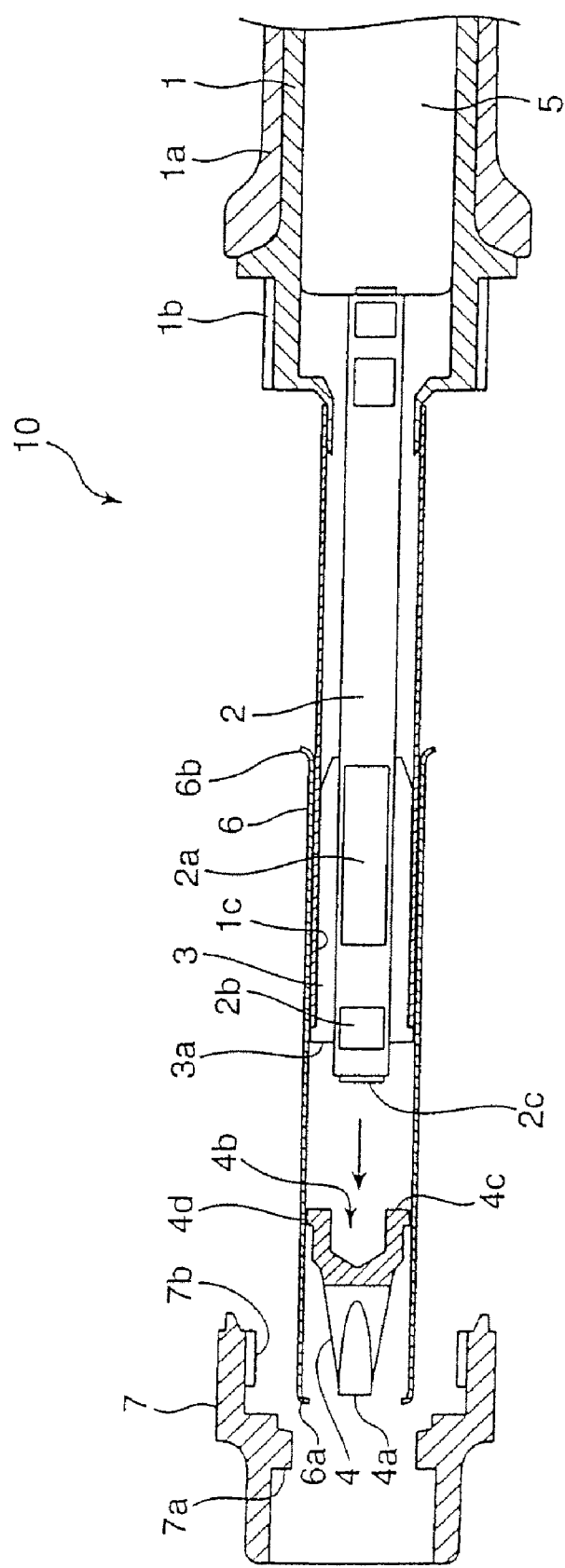
FIG. 3 is an enlarged view of the tip area of FIG. 2.

FIG. 2 is a cross-sectional view of the soldering iron 10, and FIG. 3 is a close up view of the heater cartridge assembly area. The heater cartridge assembly 11 includes a sleeve 3 adapted to receive a heater 2 having a contact end 12. The casing 1 has an opening with electrical leads adapted to electrically couple to the contact end 12 to provide power to the heater 2. The heater 2 includes a heating element 2a near the face end 3a of the sleeve. The power through the contact end 12 is provided to the heating element 2a to generate heat for melting solder. The sleeve 3 may be made from a material having high thermal transmissivity and substantially covers the circumferential periphery of the ceramic heater 2 and is in close contact with the ceramic heater 2. The tip 4 is configured to releaseably couple to the face end 3a of the sleeve 3, whereby the tip 4 is near the heating element 2a. The face end 3a may have a circular face. The casing 1 may include a temperature control device 5, at the interior of the casing 1, to control the power provided to the heater 2a, thereby controlling the temperature of the tip 4. The heat generated by the heater 2 is conducted through the sleeve 3 to the face end 3a and then to the tip 4 to melt the solder.

The casing 1 may have a substantially tubular configuration made from metal or from a hard, heat-resistant synthetic resin; the circumferential periphery thereof is provided with a grip 1a made of a heat insulating and elastic synthetic material. For instance, the casing 1 may be made of synthetic rubber so that an operator can grip the handle of the soldering iron 10. The ceramic heater 2 may have a circular configuration made from ceramic and provided so as to generate heat for heating solder. The ceramic heater 2 can have a temperature sensor 2b positioned near the face end 3a with the heating element 2a disposed between the sensor 2b and the contact end 12. A portion 2c of the temperature sensor 2b may protrude from the sleeve 3 and is sized to fit within the tip 4 as discussed below.

Figure 4B:
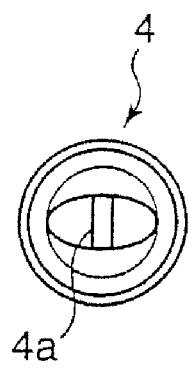
FIG. 4(b) is a front view of the tip of FIG. 4(a).
Figure 4A:
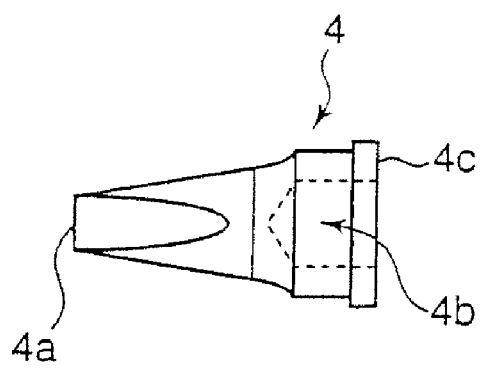
FIG. 4(a) is a side view of a tip having a recess.
Figure 4C:
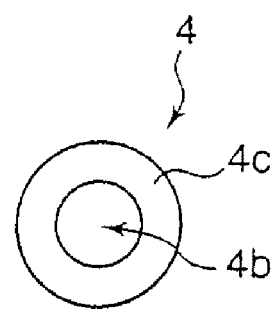
FIG. 4(c) is a base view of the tip of FIG. 4(a).

FIGS. 4 (a), (b), and (c) illustrate the side view, front view, and base view of the tip 4, respectively. FIG. 4(c) illustrates the base of the heat-receiving face 4c of the tip 4, which may have a recess 4b adapted to receive at least a portion of the temperature sensor 2c. The recess 4b is adapted to receive the front portion 2c of the temperature sensor 2b so that the heat-receiving face 4c may make a thermal contact with the face end 3a formed at the foreward end of the sleeve 3. The heating element 2a may make a thermal contact with the sleeve 3 so that heat from the heating element 2a may conduct through the sleeve and the heat-receiving face 4c and towards the edge 4a of the tip 4 to heat and melt the solder on a substrate, such as a circuit board. The tip 4 may be made from a variety of materials known to one skilled in the art, such as copper, having a high thermal transmissivity. The tip 4 may be also iron plated to prevent erosion from occurring from the solder. In addition, the tip 4 may be chromium plated to prevent solder creep.

Figure 5A:
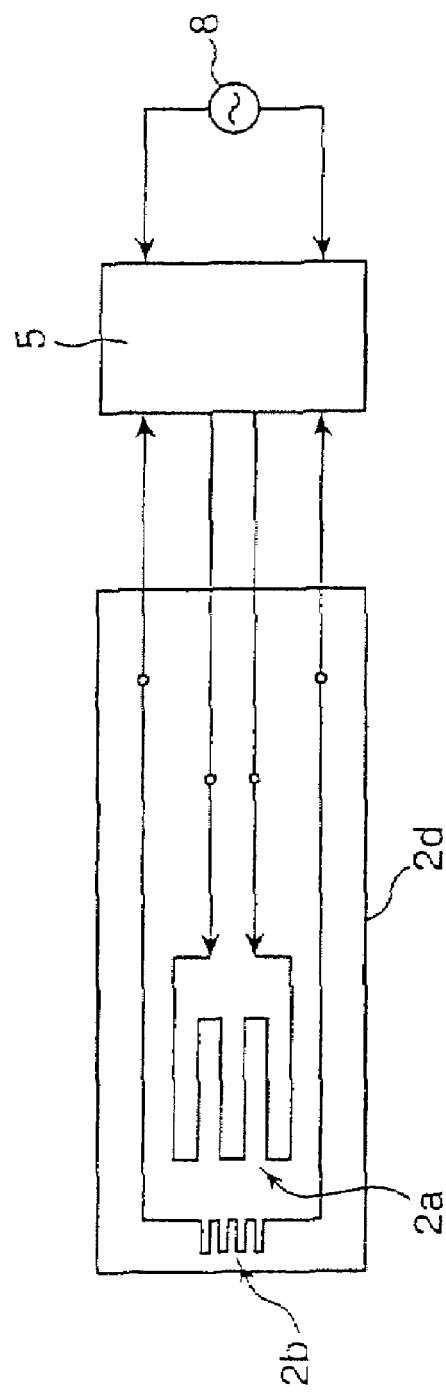
FIG. 5(a) is a schematic view of a ceramic heater having temperature sensor and a heater.
Figure 5B:
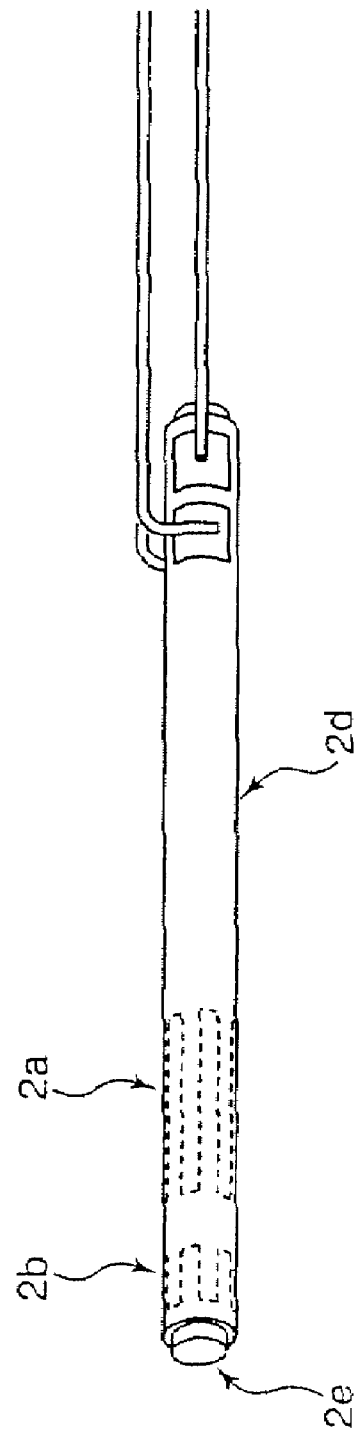
FIG. 5(b) illustrates a ceramic sheet wrapped around a ceramic rod to form the ceramic heater.

FIG. 5(a) illustrates a circuit of the heater 2 that may be formed by printing the circuit schematic on the ceramic sheet 2d. For instance, the heat-generating resistor pattern of tungsten 2a, or the like, and a temperature-sensing resistor pattern of tungsten 2b, or the like, may be printed onto a ceramic sheet 2d. As illustrated in FIG. 5(b), the ceramic sheet 2d may be wrapped around a ceramic rod 2e to form the heater 2. The ceramic sheet 2d including the temperature sensor 2b and the heating element 2a may be positioned near the surface of the heater 2 such as about 0.3 mm or between 0.1 mm and 0.5 mm from the surface of the heater 2. The rod 2e and the sheet 2d may be bonded by heating both of them so that the temperature sensor 2b is wrapped around the cylindrical ceramic rod 2e, having a base of alumina or silicon nitride. As such, the heating element 2a and temperature sensor 2b may be integrated to form the heater 2.

Figure 5C:
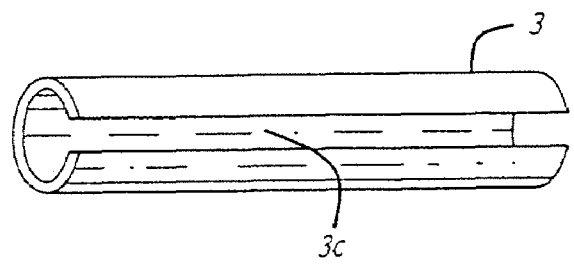
FIG. 5(c) is a perspective view of a sleeve with a slit.

FIG. 5(c) is a perspective view of a sleeve 3 having a longitudinal slit 3c. The slit 3c allows the sleeve 3 to radially expand and contract. The heater 2 formed from the ceramic rod 2e preferably has sufficient stiffness and strength to be press-fitted into the sleeve 3. This way, the heater 2 may form a more direct thermal contact with the sleeve 3 providing for efficient transfer of heat from the heating element 2a to the sleeve 3. The heater 2 may be press-fitted into the sleeve 3 of FIG. 5(c) to allow at least a portion of the temperature sensor 2b to protrude from the face end 3a of the sleeve 3.

Figure 5D:
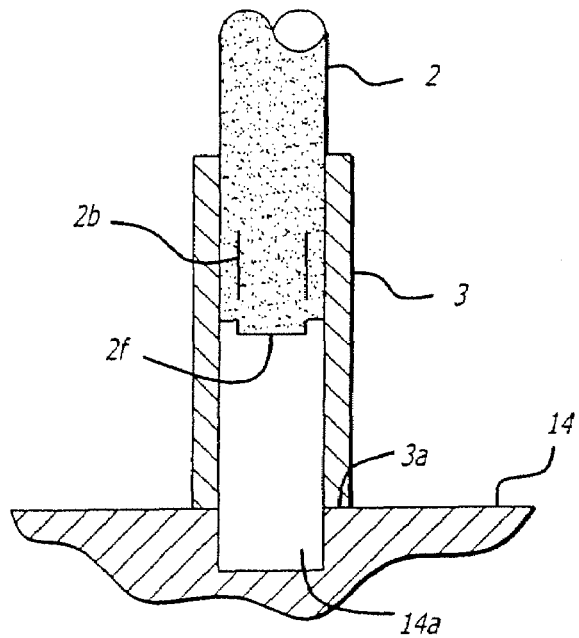
FIG. 5(d) is a cross-sectional view of a heater being press-fitted into a sleeve.

FIG. 5(d) is a cross-sectional view of the heater 2 being press fitted into the sleeve 3. The sleeve 3 may be placed over a mount 14 with a cavity 14a having a predetermined depth. As the heater 2 is pressed into the sleeve 3, the fore end 2f of the rod 2e protrudes from the face end 3a of the sleeve 3 at the predetermined depth to accurately control the distance that the temperature sensor protrudes from the sleeve. This way, each heater cartridge 11 may be provided with the temperature sensor 2b protruding from the face end 3a of the sleeve 3 in a substantially similar manner.

Figure 5E:
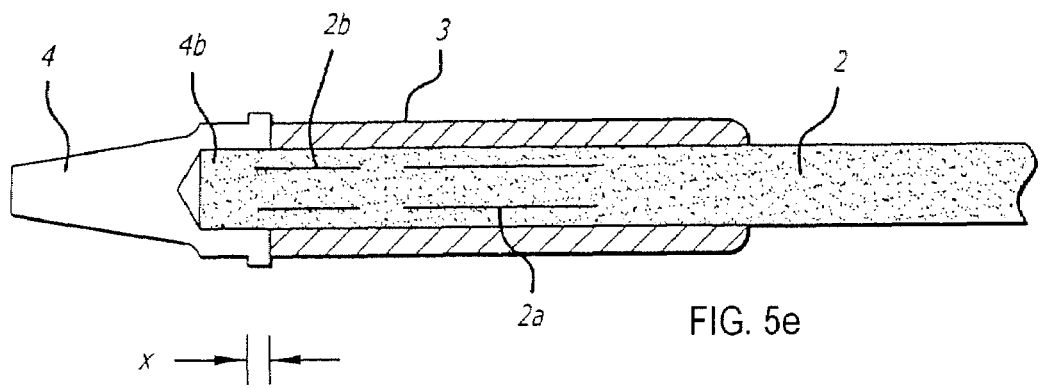
FIG. 5(e) is a cross-sectional view of heater, sleeve, and tip.

FIG. 5(e) is a cross-sectional view of the heater cartridge 11 with the heater 2 press-fitted into the sleeve 3 with at least a portion of the temperature sensor 2b protruding from the sleeve; the protruding portion being positioned in the recess 4b of the tip 4. For measuring temperature, the portion as illustrated by reference letter X in FIG. 5(e) of the temperature sensor 2b that is inserted into the recess 4b may be between about 0.3 mm and 2.0 mm. The depth of the recess 4b may be between about 1.5 mm and 5.0 mm, and in particular about 3.0 mm. The diameter of the recess 4b may be between about 3.8 mm and about 4.3 mm. With the heating element 2a being integrated with the temperature sensor 2b and with the tip 4 being in close proximity with the temperature sensor 2b, the control device 5 can monitor the temperature of the tip 4 and quickly adjust for the temperature difference between the tip 4 and a set value. Excessive temperature rises in the heating element 2a are thereby minimized. FIG. 5(e) shows that a gap may be formed between the fore end 2f of the heater 2 and the tip 4. The fore end 2f, however, may be configured so that a thermal contact may be made between the fore end 2f and the tip 4.

The sleeve 3 may cover the circumferential periphery of the ceramic heater 2 and be in close contact with the ceramic heater to transmit the heat generated by the heating element 2a of the ceramic heater to the soldering iron tip 4 with the temperature sensor 2b being in close proximity with the tip 4. The temperature sensor thereby can measure the temperature of the tip with minimal time delay. The sleeve 3 may be formed from silver or copper or other materials having high thermal transmissivity. The heater cartridge assembly 11 includes a holder tube 1c adapted to receive the sleeve 3 to couple the sleeve and the heater 2 to the casing 1. The holder tube 1c may be sized and configured so that the sleeve 3 may be inserted and retained within the holder tube 1c. Once the cartridge assembly is assembled, the holder tube 1c may be positioned near the grip portion 1a of the casing 1. To minimize transfer of heat from the holder tube 1c to the grip portion 1a, the holder tube 1c may be made of material having high thermal resistance or low thermal conductivity such as stainless steel. This way, a user may more comfortably grip the grip portion 1a while operating the soldering iron.

Figure 5F:
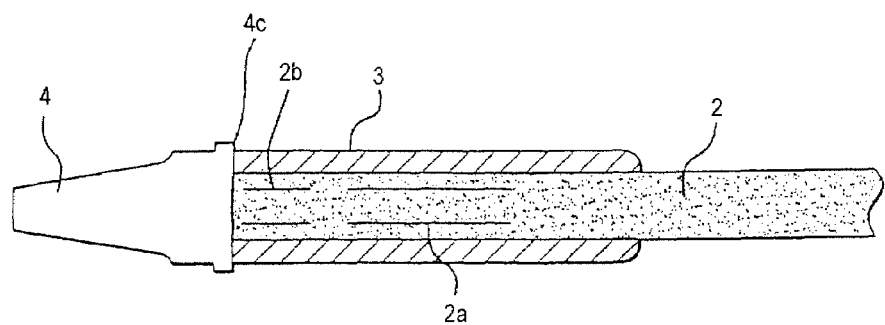
FIG. 5(f) is a cross-sectional view of a heater in a flush position with a sleeve.

FIG. 5(f) illustrates that the ceramic heater 2 may be fitted into the sleeve 3 to form a close thermal contact between the ceramic heater 2 and the sleeve without the temperature sensor 2b protruding from the sleeve. As discussed above in relation to FIG. 5(d), a direct thermal contact may be formed between the ceramic heater 2 and the sleeve 3 by press fitting the heater 2 into the opening of the sleeve until the end of the ceramic heater 2 is flush with the end of the sleeve 3, as illustrated in FIG. 5(f). In such instances, the tip 4 may be provided without the recess 4b such that the heat receiving face 4c may be a solid surface to form a thermal contact with the end of the ceramic heater 2 and the heat transfer face end 3a of the sleeve 3. With the ceramic heater 2 in direct thermal contact with the sleeve 3, the heat generated by the ceramic heater 2 ray efficiently conduct through the sleeve 3 and then to the heat receiving face 4c of the tip 4. The temperature sensor 2b may be provided adjacent or near the heat receiving face 4c to measure the temperature of the tip 4 with minimal delay.

Figures 5G, 5H, 5I:
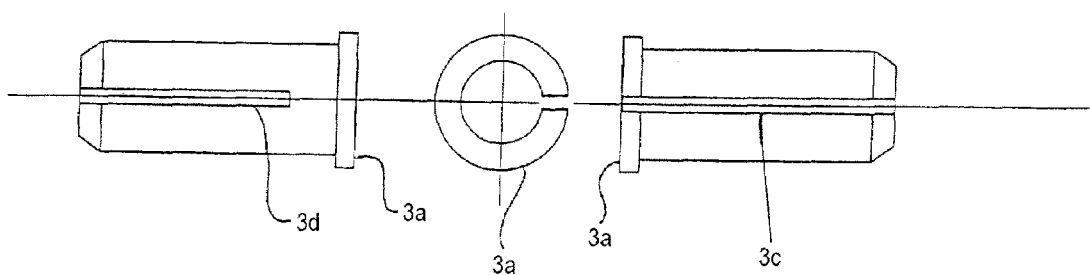
FIG. 5(g) is a side view of a sleeve with a partial slit.
FIG. 5(h) is a front view of the sleeve of FIG. 5(g).
FIG. 5(i) is an opposing side view of the sleeve of FIG. 5(g) with a slit along the length of the sleeve.

FIGS. 5(g) through 5(i) illustrate that the sleeve 3 may have a plurality of slits (or slots) to allow the sleeve 3 to expand while the ceramic heater 2 is being press fitted into the opening of the sleeve 3. For instance, FIG. 5(g) illustrate that on one side of the sleeve 3 a partial slit 3d may be formed that does not pass through the heat transfer face end 3a of the sleeve 3. On opposite side of the sleeve 3, FIG. 5(i) shows another slit 3c that passes through the entire length of the sleeve 3. The sleeve 3 thereby, while unitary, can expand and contract along the slits 3c and 3d to receive the ceramic heater 2 so that a direct thermal contact may be formed between the sleeve 3 and the ceramic heater 2. Note that the sleeve 3 may have a number of slits to allow the sleeve 3 to expand and contract to receive the ceramic heater 2 and then form a thermal contact with the ceramic heater 2. For instance, the sleeve 3 may have three or four slits with two or three partial slits and one slit along the entire length of the sleeve. In addition, a slit may also run diagonally between the two opposing ends of the sleeve 3.

Figure 5J:
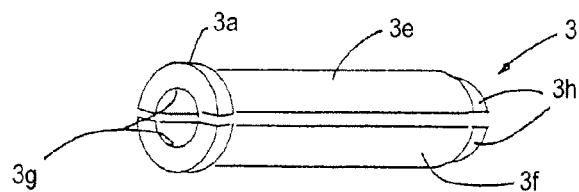
FIG. 5(j) illustrates a sleeve divided into a plurality of portions.
Figure 5K:
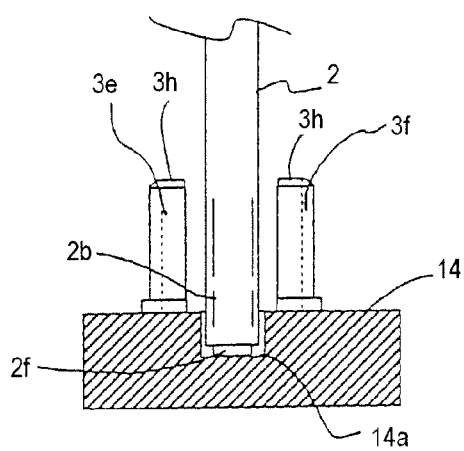
FIG. 5(k) illustrates two portions of the sleeve being placed against a ceramic heater.
Figure 5L:
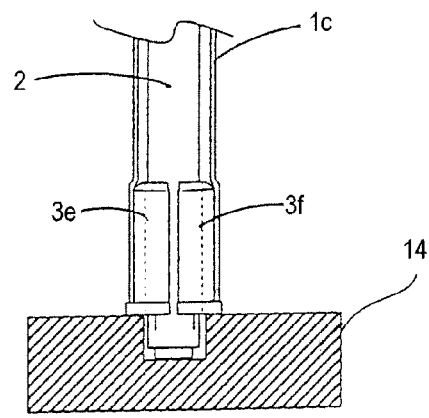
FIG. 5(l) illustrates the two portions of the sleeve being press fitted against a ceramic heater by a holding tube.

FIGS. 5(j), 5(k) and 5(l) illustrate a ceramic heater 2 being sandwiched by a first portion 3e and a second portion 3f of the sleeve 3. The two portions 3e and 3f of the sleeve 3 are then press-fitted against the ceramic heater 2 by a holding tube 1c. In particular, FIG. 5(j) illustrates that the sleeve 3 may be provided in a plurality of pieces such as in two portions 3e and 3f. The inner-arc area 3g of the two portions 3e and 3f may substantially conform to the outer diameter of the ceramic heater 2. As such, when the two portions 3e and 3f are pressed against the ceramic heater 2, direct thermal contact is formed between the two portions 3e and 3f and the ceramic heater 2. With the sleeve 3 divided into two portions, the inner-arc area 3g and the outer surface of the two portions 3e and 3f may be easily treated or plated to substantially prevent oxidization from forming between the two portions 3e and 3f of the sleeve 3 and the ceramic heater 2 due to high temperature therein. In addition, the two portions 3e and 3f may be treated or plated to improve the thermal contact between the two portions 3e and 3f and the ceramic heater 2.

FIGS. 5(k) and 5(l) illustrate a method in which the two portions 3e and 3f of the sleeve 3 may be press-fitted against the ceramic heater 2 without scratching or damaging the plating on the inner-arc area 3g of the two portions 3e and 3f. FIG. 5(k) illustrates the forward end 2f of the ceramic heater 2 placed inside the cavity 14a of the mount 14 such that a portion of the temperature sensor 2b is within the cavity 14a. The two portions 3e and 3f of the sleeve 3 are then placed against the ceramic heater 2. Once the two portions 3e and 3f of the sleeve 3 are placed against the ceramic heater 2, the outer diameter of the two portions 3e and 3f may be substantially similar or slightly larger than the inner diameter of the holding tube 1c. As such, as illustrated in FIG. 5(l), once the holding tube 1c is fitted over the two portions 3e and 3f of the sleeve 3, the two portions 3e and 3f may be press-fitted against the ceramic heater 2. With the assembly method illustrated in FIGS. 5(k) and 5(l), a plating layer within the inner-arc area 3g of the two portions 3e and 3f is substantially preserved so that good thermal contact may be formed between the ceramic heater 2 and the two portions 3e and 3f of the sleeve 3. Note that the sleeve 3 may have a beveled edge 3h on the opposite end of the heat transfer facing end 3a so that when the holding tube 1c is press-fitted over the two portions 3e and 3f, the beveled edge 3h assists in fitting the holding tube 1c over the two portions 3e and 3f.

As illustrated in FIG. 5(j), the sleeve 3 may be divided into a number of portions such as two portions 3e and 3f. Alternatively, the sleeve 3 may be divided into three or more portions. In addition, the sleeve 3 described in 5(j) may be fitted with the ceramic heater 2 as illustrated in FIG. 5(f) such that the fore-ends of the sleeve 3 and the ceramic heater 2 are flush with respect to each other.

FIGS. 2 and 3 illustrate that the tip 4 may be configured to have a locking member 4d along the edge of the base 4c to engage with a reduced-diameter end section 6a of a locking tube 6. The locking tube 6 may be formed of metal with a circumferential periphery to fit over the sleeve 3. The locking tube 6 has an outer aft end 6b that expands so that the diameter of the outer end 6b is greater than the diameter of the body of the locking tube 6. The tip 4 may be inserted into the locking tube 6 through the opening formed on the outer aft end 6b of the locking tube 6. Likewise, the fore end 2c of the ceramic heater 2 protruding from the sleeve 3 may be inserted behind the tip so that once the cartridge assembly 11 is assembled, the base 4c of the tip 4 may form a thermal contact with the face end 3a of the sleeve 3.

The clamping ring 7 may have a threaded section 7b adapted to engage with the threaded section 1b formed on the forward end of the casing 1. To engage the heater cartridge assembly 11 to the casing 1, the clamping ring 7 may be placed over the heater cartridge assembly 11 and the threaded section 7b may be rotated to engage with the threaded section 1b of the casing 1. The clamping ring 7 may have a retaining member 7a with a smaller diameter configured to secure the aft end 6b of the locking tube 6 with the foreward end of the threaded section 1b. Securing the locking tube 6 with the casing 1 also secures the tip 4 to the face end 3a of the sleeve 3 to form a thermal contact between the base 4c of the tip and the face end 3a of the sleeve 3. Thereby, heat generated from the heating element 2a may be conducted to the sleeve and to the tip 4.

The casing 1 may include a temperature control device 5 capable of controlling the temperature of the tip 4 by varying the current or power provided to the heating element 2a. The temperature control device 5 may vary the current based on the difference between the value of the temperature measured by the temperature sensor 2b and the set temperature value of the tip 4. FIG. 5(a) illustrates that the temperature control device 5 may be electrically coupled to the temperature sensor 2b and the heating element 2a. The control device 5 is also connected to a power source 8 by way of an electrical cord 1d as shown in FIG. 1.

The temperature of the tip 4 may be measured by detecting the potential difference from the temperature sensor 2b. The temperature of the tip 4 may be controlled so that the temperature of the tip 4 is substantially equal to the set temperature value by varying the current to the heating element 2a with the ON/OFF control based on the potential difference between the measured temperature value and the set temperature value. The control device 5 may apply full current when the temperature of the tip which sensor 2b measures is below the set temperature value to quickly restore the temperature of the tip 4.

FIG. 3 illustrates that if the edge 4a of the soldering iron tip 4 becomes worn or if a different soldering tip is desired for a particular soldering application, the tip 4 may bet replaced. The tip 4 may be replaced by rotating or unscrewing the clamping ring 7 to disengage the threaded section 7b from the threaded section 1b provided on the forward end of the casing 1, thereby releasing the heating cartridge assembly 11 from the casing 1. The heating cartridge assembly 11 may be disassembled by removing the locking tube 6 to expose the soldering tip 4 and the holding tube 1c. The old tip 4 may be removed from the fore end 2c of the ceramic heater 2, and a new tip fitted into the fore end 2c of the ceramic heater 2 such that at least a portion of the temperature sensor 2b is fitted inside the recess 4b of the new tip. As such, only the tip 4 is replaced instead of the entire tip and the sleeve combination being replaced to minimize the cost of operating the soldering iron 10. With the new tip in place, the heater cartridge assembly 11 may be reassembled by positioning the locking tube 6 over the tip and the ceramic heater 2. The heater cartridge assembly may be coupled to the casing 1 by placing the clamping ring over the heater cartridge assembly and rotating the clamping ring 7 until the threaded sections 7b and 1b are secured together.

Once the heater cartridge assembly is coupled to the casing 1, the sleeve 3 substantially covers the heater 2 to form a thermal contact between the sleeve 3 and the heater 2. The outer configuration of both the heater 2 and the sleeve 3 may have a circular (or cylindrical) shape. In addition, the sleeve 3 may have a circular opening adapted to receive the heater 2 having a circular shape to form a close thermal contact between the sleeve and the heater. Both the heater 2 and the sleeve 3 may be elongated to form a large thermal contact area to efficiently transfer heat from the heater to the sleeve. To efficiently transfer heat to the tip 4, the heat-receiving face 4c is configured to form a thermal contact with the annular heat-transfer face 3a provided at the foreward end face of the sleeve 3; and the recess 4b is configured to form a thermal contact with at least the portion 2c of the temperature sensor 2b to provide a large thermal contact area between the tip 4 and the heater 2. As such, an efficient heat transfer is made from the heater 2 to the tip 4. The sleeve 3 may be made of a variety of heat conductive materials such as silver and copper. The heating element 2a may be made of tungsten or other material which efficiently converts electrical current to heat.

Figure 6A:
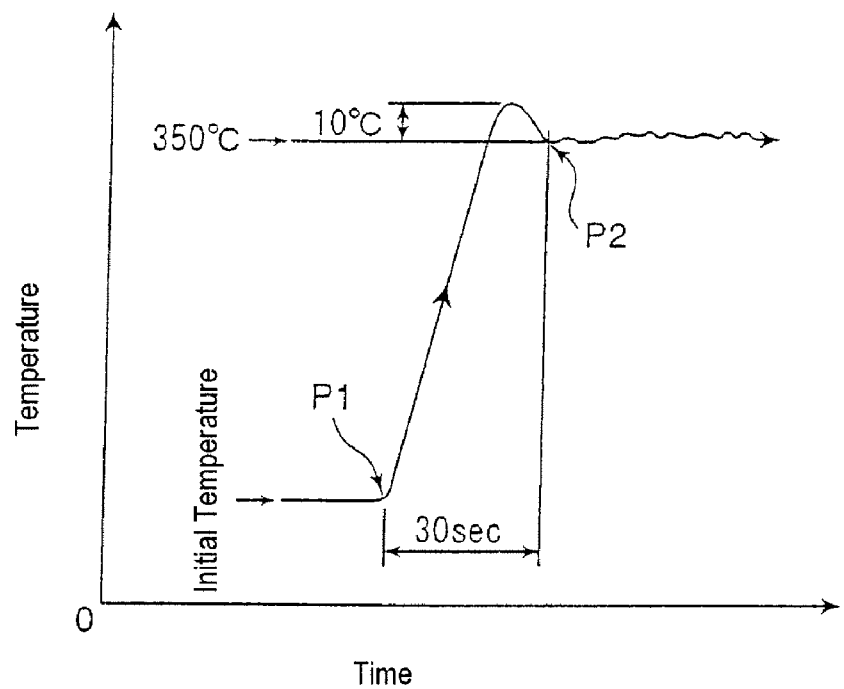
FIG. 6(a) is a graph of a temperature control curve for a conventional soldering iron.
Figure 6B:
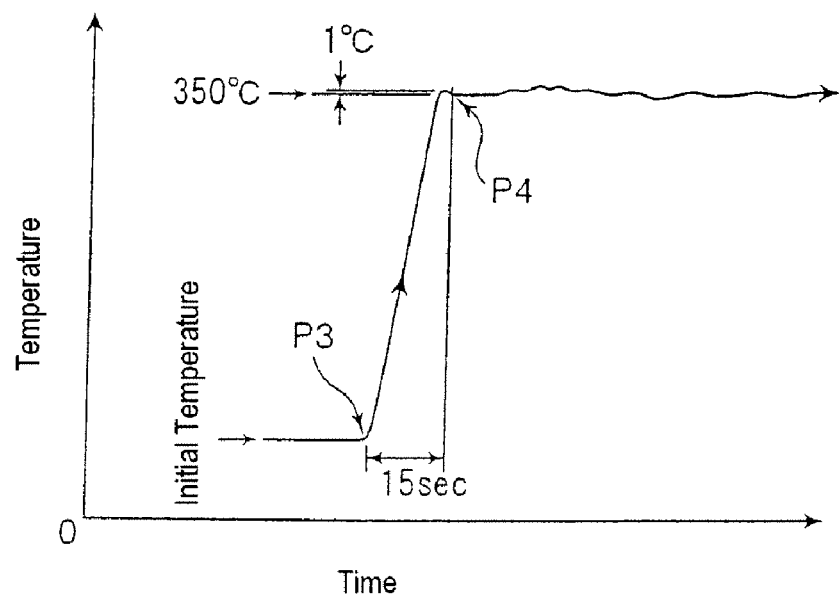
FIG. 6(b) is a graph of a temperature control curve for a soldering iron in accordance with this invention.

FIGS. 6(a) and (b) illustrate temperature control characteristics of two soldering irons. FIG. 6(a) shows a temperature control curve for a conventional soldering iron; and FIG. 6(b) shows a temperature control curve for a soldering iron 10 in accordance with the present invention. For purposes of this analysis, the temperature control devices for both soldering irons were controlled by varying the current to its heating element with ON/OFF control, and the temperature of the tips for both soldering irons were set at 350° C.

With reference to FIG. 6(a), a soldering iron of the same type as disclosed in JP-11-506054-A described above and whose entire contents are hereby incorporated by reference ("the conventional soldering iron") was used to measure the temperature control characteristics. In the conventional soldering iron, the tip contacts the free end of the sleeve 3, rather than being mated with the foreward end of the ceramic heater. With such construction, the heat transmission from the sleeve to the soldering iron tip and thereby the thermal efficiency of the soldering iron are poor. As such, after the conventional soldering iron is turned on, it may take approximately thirty seconds for the temperature of the tip to stabilize at the set temperature. Additionally, the conventional soldering iron has a gap between the temperature sensor and the heating element, and another gap between the heating element and the tip. Because of these gaps, the temperature sensor lags behind in measuring the temperature of the tip. As such, the control device is slow to maintain the temperature of the tip at the set value. For instance, when the conventional soldering tool is initially turned on, the delay in measuring the temperature of the tip causes an excessive temperature rise in the heating element and the tip, and as illustrated in FIG. 6(a), an overshoot of approximately 10° C. is produced in the tip.

With the soldering iron 10 in accordance with this invention, the heat transfer face 3a forms a good thermal contact with the fore end 2c of the ceramic heater 2, so that the heat transfer between the temperature sensor 2b and the tip 4 is more efficient than the conventional soldering iron. In addition, the distance between the temperature sensor 2b and the heating element 2a and the soldering iron tip 4 is smaller than that of the conventional soldering iron to minimize the time the temperature sensor takes to measure the temperature of the tip. This is done, for example, by inserting at least a portion of the temperature sensor 2b into the recess 4b of the tip 4. As illustrated in FIG. 6(b), when the soldering iron 10 in accordance with this invention is initially turned on, it takes approximately fifteen seconds for the tip temperature to stabilize at the set temperature. In addition, the soldering iron 10 operates more efficiently because the overshoot is about 1° C. over the set value versus 10° C. in the conventional soldering iron, as shown in FIGS. 6(a) and 6(b). This means that less power is needed to reach the operating temperature with the soldering iron 10 than with the conventional soldering iron.

With the efficient heat transfer from the heater 2 to the tip 4, the overshooting effect due to the heater 2 generating excess heat to maintain the tip 4 at the set value is minimized. As such, the grip 1a, positioned near the heater 2, is exposed to lower temperatures so that a user may more comfortably handle the soldering iron 10. Alternatively, the length of the soldering iron 10 may be shortened so that the soldering iron 10 may be handled more easily.

Figure 7:
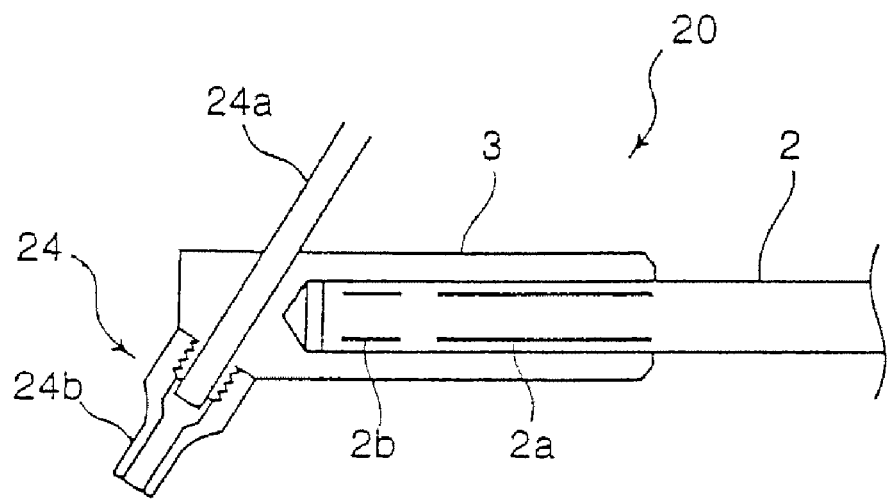
FIG. 7 is a cross-sectional view of a desoldering iron in accordance with this invention.

FIG. 7 is a cross-sectional view of a soldering iron shown generally at 20 of the present invention adapted for a desoldering operation. The soldering iron 20 includes a tip shown generally at 24 and having a suction pipe 24a adapted to couple to a vacuum source, not shown, in FIG. 7. The sleeve 3 is adapted to couple the tip 24 in a tangential relationship with the heater 2. The tip 24 also has a nozzle 24b capable of heating and melting solder on a substrate and removing the melted solder by vacuum suction through the nozzle 24b and the suction pipe 24a.

Figure 8:
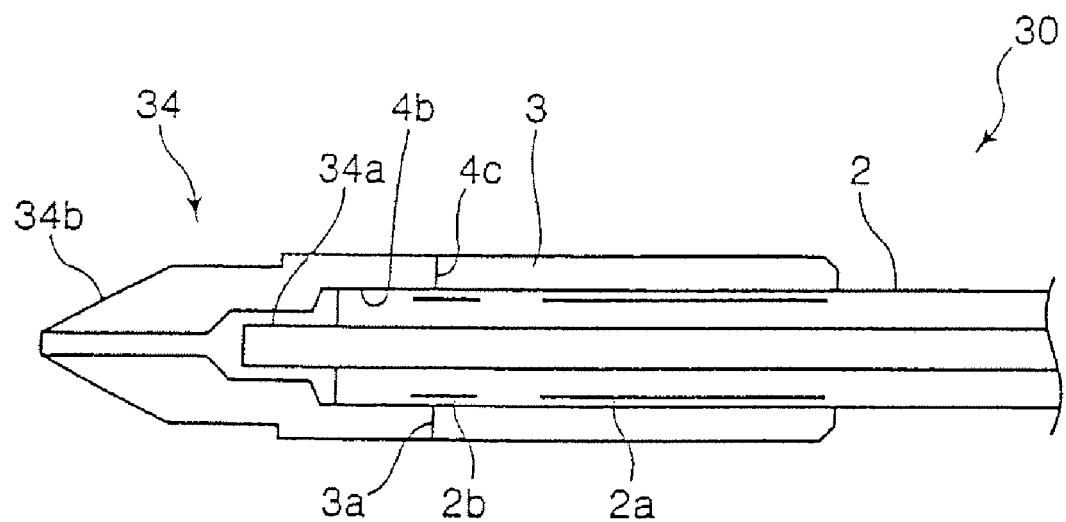
FIG. 8 is a cross-sectional view an alternative desoldering iron in accordance with this invention.

FIG. 8 is a cross-sectional view of a soldering iron shown generally at 30 and adapted for a desoldering operation. The soldering iron 30 has a suction pipe 34a that is coupled to a vacuum source, not shown in FIG. 8. The soldering iron 30 has a nozzle 34b capable of heating and melting solder on a substrate and removing the melted solder through an opening in the nozzle 34b and through the suction pipe 34a. The nozzle 34b may be formed on the sleeve 3, where the nozzle 34b is substantially aligned with the longitudinal direction of the suction pipe 34a.

FIGS. 9(a)-9(c) illustrate the heat-receiving face 4c of the tip 4 having a bore 4e along with the recess 4b discussed above. As illustrated in FIG. 9(b), the bore 4e may have a configuration adapted to receive a head 3b (FIG. 9(c)) protruding from the heat transfer face 3a of the sleeve 3. The combination of the bore 4e and head 3b engages the tip 4 with the sleeve 3 at a predetermined orientation. The combination of the bore 4e and the head 3b also provides additional thermal contact area between the tip and the sleeve. The replacement tips may be also provided with a bore to orient the replacement tip in the substantially similar manner as the original tip 4 with respect to the sleeve 3.

FIGS. 9(d) through 9(i) illustrate that the heat-receiving face 4c may have a bore with a variety of configurations adapted to receive a corresponding head protruding from the heat transfer face 3a of the sleeve 3. FIGS. 9(d) through 9(f) illustrate the heat-receiving face 4c having a bore 4e forming a "T" configuration adapted to receive the corresponding head 3b having a protrusion also in the form of a "T" configuration. FIGS. 9(g) through 9(i) illustrate the heat-receiving face 4c having a bore 4e in the form of a half-circle configuration adapted to receive the corresponding head 3b having a protrusion also in the form of a half-circle configuration.

Figure 10A:
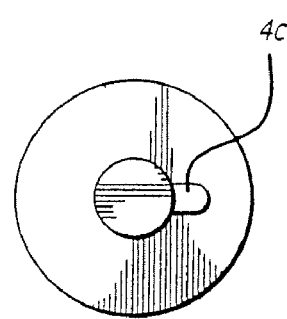
FIG. 10(a) is an enlarged view of a tip having a bore.
Figure 10B:
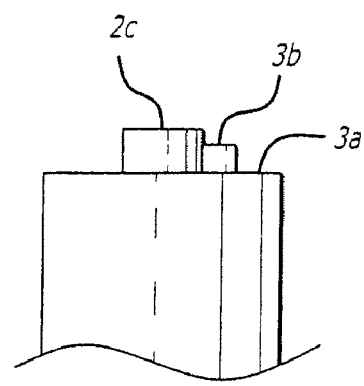
FIG. 10(b) is an enlarged view of the sleeve with a head corresponding to the bore of FIG. 10(a) where the head is in thermal contact with a temperature sensor protruding from the sleeve.
Figure 10C:
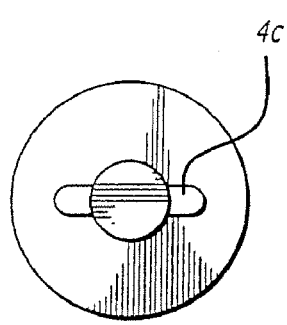
FIG. 10(c) is an enlarged view of a tip having an alternative bore.
Figure 10D:
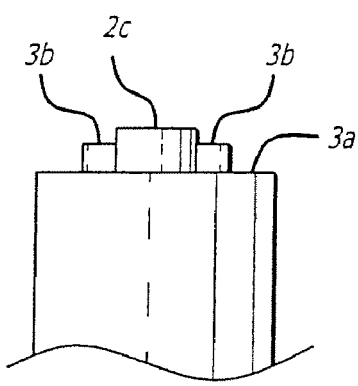
FIG. 10(d) is an enlarged view of the sleeve with a head corresponding to the bore of FIG. 10(c) where the head is in thermal contact with a temperature sensor protruding from the sleeve.
Figure 10E:
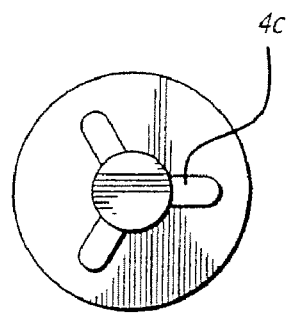
FIG. 10(e) is an enlarged view of a tip having another alternative bore.
Figure 10F:
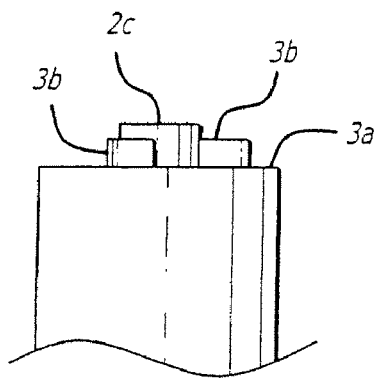
FIG. 10(f) is an enlarged view of the sleeve with a head corresponding to the bore of FIG. 10(e) where the head is in thermal contact with a temperature sensor protruding from the sleeve.
Figure 11:
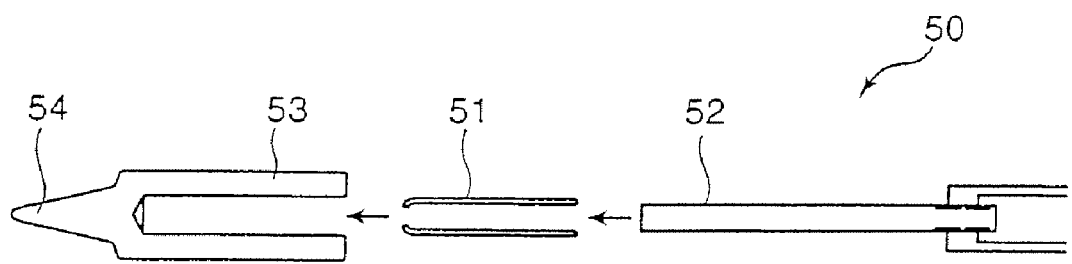
FIG. 11 is a cross-sectional view of a conventional soldering iron.

FIG. 10(a) illustrates that the head 3b may protrude from the heat transfer face 3a along the side of the temperature sensor 2c. As illustrated in FIG. 10(b), the tip 4 may have a corresponding bore 4c along the heat-receiving face 4c adapted to receive the head 3b. The head 3b is in thermal contact with the temperature sensor 2c that provides additional surface area to make thermal contact between the temperature sensor 2c and the tip 4. This allows the temperature sensor 2c to quickly detect the temperature of the tip with minimal delay. FIGS. 10(c) through 10(f) illustrate that a plurality of heads 3b may protrude from the heat transfer face 3a which are in contact with the temperature sensor 2c to provide additional surface areas to make thermal contact between the temperature sensor 2c and the tip 4. The configuration of the head 3b and the number of heads provided on the heat transfer face 3a may vary, and other combinations of bore and head may be formed on the tip and the sleeve to provide a good thermal contact therebetween. Pursuant to an alternative embodiment, the bore may be formed within the heat transfer face 3a and the corresponding head formed on the heat receiving face 4c. Alternatively, a plurality of spaced teeth on the heat transfer face which interlock or mate with a plurality of spaced teeth on the heat receiving face may be provided to increase the thermal contact area between the temperature sensor 2b and the tip.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:
1. A soldering or desoldering iron, comprising:
a ceramic heater including a ceramic rod and a ceramic sheet wrapped around the ceramic rod, the ceramic heater further including a heating element portion and a temperature sensor portion, a heating element contained entirely in the heating element portion, a temperature sensor contained entirely in the temperature sensor por- tion, each of the heating element and temperature sensor including a pattern disposed on the ceramic sheet and between the ceramic rod and the ceramic sheet;

a sleeve made of a heat conductive material and press-fitted on at least a portion of the ceramic heater that includes the entire heating element portion and a part of the temperature sensor portion, and the sleeve including a forward end that includes a heat-transferring face, wherein at least a part of the temperature sensor portion protrudes from the forward end of the sleeve;

a replaceable soldering or desoldering tip including a base end and a heat-receiving face at the base end, wherein the heat-receiving face of the tip is in direct contact with the heat-transferring face of the sleeve to conduct heat generated by the heating element to the tip, and wherein the base end of the tip has a recess into which the temperature sensor portion protrudes, and wherein only the temperature sensor portion of the ceramic heater protrudes into the recess and the heating element portion of the ceramic heater is not in direct contact with the tip; and a clamp that secures the soldering or desoldering tip against the sleeve to maintain the contact between the heat-receiving face of the tip and the heat-transferring face of the sleeve.

2. The soldering or desoldering iron of claim 1, wherein the ceramic sheet has a thickness within about 0.1 mm to about 0.5 mm.

3. The soldering or desoldering iron of claim 1, wherein the temperature sensor portion protrudes between about 0.3 mm and about 2.0 mm from the forward end of the sleeve.

4. The soldering or desoldering iron of claim 1, further comprising a control device coupled to the temperature sensor and adapted to provide current to the heating element based on a difference between a temperature measured by the temperature sensor and a desired temperature of the tip.

5. The soldering or desoldering iron of claim 1, wherein the sleeve has a slit that extends the entire longitudinal length of the sleeve to allow the sleeve to radially expand and contract.

6. The soldering or desoldering iron of claim 1, wherein the sleeve includes a rear end and a chamfered edge at the rear end.

7. The soldering or desoldering iron of claim 1, wherein the pattern for the temperature sensor is disposed partially within the sleeve and partially within the recess of the tip.

8. The soldering or desoldering iron of claim 1, wherein a forward end of the ceramic rod protrudes from a forward end of the ceramic sheet, the forward end of the ceramic rod and the forward end of the ceramic sheet disposed within the recess of the tip.

9. The soldering or desoldering iron of claim 1, wherein the heat-transferring face of the sleeve and the heat-receiving face of the tip are planar surfaces.

10. The soldering or desoldering iron of claim 1, wherein the sleeve includes a head member that protrudes from the heat-transferring face of the sleeve, and the tip includes a bore formed into the heat-receiving face of the tip, the head member disposed in the bore, the head member and the bore configured maintain the tip at a predetermined orientation relative to the sleeve.

11. The soldering or desoldering iron of claim 1, wherein a forward end of the ceramic heater is disposed in the recess of the tip.

12. The soldering or desoldering iron of claim 11, wherein the forward end of the ceramic heater is in thermal contact with the temperature sensor.

* * * * *